(12) United States Patent
Duato Marin et al.

(10) Patent No.: US 8,085,659 B2
(45) Date of Patent: Dec. 27, 2011

(54) METHOD AND SWITCH FOR ROUTING DATA PACKETS IN INTERCONNECTION NETWORKS

(75) Inventors: Jose Francisco Duato Marin, Velencia (ES); Francisco Gilabert Villamon, Valencia (ES); Crispin Gomez Requena, Valencia (ES); Maria Engracia Gomez Requena, Valencia (ES); Pedro Juan Lopez Rodriguez, Valencia (ES)

(73) Assignee: Universidad Politecnica de Valencia, Valencia (ES)

( * ) Notice: Subject to any disclaimer, the term of this patent is extended or adjusted under 35 U.S.C. 154(b) by 424 days.

(21) Appl. No.: 11/845,813

(22) Filed: Aug. 28, 2007

(65) Prior Publication Data

US 2009/0059913 A1    Mar. 5, 2009

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |

(52) U.S. Cl. ........ 370/230; 370/236; 370/386; 370/396; 709/239; 709/240

(58) Field of Classification Search .................. 370/230, 370/230.1, 236, 237, 386, 388, 393, 396; 709/212, 235, 239, 240; 710/29; 712/201; 718/102, 103

See application file for complete search history.

(56) References Cited

U.S. PATENT DOCUMENTS

| | | | | |
|---|---|---|---|---|
| 4,899,335 | A | * | 2/1990 | Johnson et al. ............... 370/392 |
| 5,701,416 | A | * | 12/1997 | Thorson et al. ................. 712/11 |
| 5,892,923 | A | * | 4/1999 | Yasuda et al. ................. 709/239 |
| 6,055,599 | A | * | 4/2000 | Han et al. ....................... 710/317 |
| 6,473,287 | B1 | * | 10/2002 | Van Ochten et al. ......... 361/232 |
| 6,473,827 | B2 | * | 10/2002 | McMillen et al. ............ 710/316 |
| 6,754,207 | B1 | * | 6/2004 | Hesse ........................... 370/388 |
| 6,909,695 | B2 | * | 6/2005 | Lee et al. ...................... 370/238 |

(Continued)

OTHER PUBLICATIONS

"Deterministic versus Adaptive Routing in Fat-Trees", Gomez, C.; Gilabert, F.; Gomez, M.E.; Lopez, P.; Duato, J.; Parallel and Distributed Processing Symposium, 2007. IPDPS 2007. IEEE International Mar. 26-30, 2007 pp. 1-8.*

(Continued)

*Primary Examiner* — Aung S Moe
*Assistant Examiner* — Benjamin H Elliott, IV
(74) *Attorney, Agent, or Firm* — McCormick, Paulding & Huber LLP

(57) ABSTRACT

The invention falls within the technology of multistage interconnection network such as fat-trees, comprising at least one switch located at a stage (s) and configured to send, through an output port from a number (k) of output ports forming an ordered list, at least a data packet containing a destination address identified by a n-tuple with a plurality (n) of components $(p_{n-1}, \ldots, p_1, p_0)$, and $s \in \{0 \ldots (n-1)\}$. The invention has application for both source and distributed routing, as deterministic and as adaptive routing, selecting an output port to be the unique or the default option to forward the packets at the switch which is the output port that has a position in the ordered list of output ports corresponding to the component $(p_s)$ of the destination address at the position given by the stage (s) of the switch.

10 Claims, 7 Drawing Sheets

U.S. PATENT DOCUMENTS

| | | | | |
|---|---|---|---|---|
| 6,950,428 | B1* | 9/2005 | Horst et al. | 370/389 |
| 7,333,444 | B1* | 2/2008 | Sharapov | 370/255 |
| 7,403,524 | B2* | 7/2008 | Hill | 370/392 |
| 7,466,701 | B2* | 12/2008 | Mondinelli et al. | 370/389 |
| 2002/0138683 | A1* | 9/2002 | McMillen et al. | 710/316 |
| 2002/0141427 | A1* | 10/2002 | McAlpine | 370/413 |
| 2003/0021227 | A1* | 1/2003 | Lee et al. | 370/228 |
| 2005/0044195 | A1* | 2/2005 | Westfall | 709/223 |
| 2005/0201356 | A1* | 9/2005 | Miura et al. | 370/351 |
| 2006/0045101 | A1* | 3/2006 | Cachin | 370/400 |
| 2009/0059913 | A1* | 3/2009 | Duato Marin et al. | 370/389 |

OTHER PUBLICATIONS

"An effective fault-tolerant routing methodology for direct networks", Parallel Processing, 2004. ICCP 2004. International Conference, 2004. Aug. 15-18, 2004, pp. 222-231 vol. 1; Gomez, M.E. Flich, J. Lopez, P. Robles, A. Duato, J. Nordbotten, N.A. Lysne, O. Skeie, T.*

"A Memory-Effective Routing Strategy for Regular Interconnection Networks", InProceedings: 2005 International Parallel and Distributed Processing Symposium (IPDPS 2005), IEEE Computer Society Press, Denver, Colorado, USA, 2005,M.E. Gomez, P. Lopez, J. Duato.*

"A Dynamic and Compact Fault-Tolerant Strategy for Fat-tree", InProceedings: IFIP International Conference on Network and Parallel Computing, IFIP, Oct. 2006, C. Gomez, M.E. Gomez, P. Lopez, J. Duato.*

"An Efficient Fault-Tolerant Routing Methodology for Fat-tree Interconnection Networks", InProceedings: Fifth International Symposium on Parallel and Distributed Processing and Applications (ISPA07), pp. 509-522, ISBN: 978-3-540-74741-3, Aug. 28-31, 2007, C. Gomez, M.E. Gomez, P. Lopez, J. Duato.*

"FT2EI: A Compact Fault-Tolerant Routing Strategy for Fat-trees with Exclusion Intervals", Proceedings: XVII Jornadas de Paralelismo, ISBN: 84-690-0551-0, Sep. 2006, C. Gomez, M.E. Gomez, P. Lopez, J. Duato.*

"A multiple LID routing scheme for fat-tree-based InfiniBand networks", Parallel and Distributed Processing Symposium, 2004. Proceedings. 18th International, Publication Date: Apr. 26-30, 2004, ISBN: 0-7695-2132-0, Xuan-Yi Lin, Yeh-Ching Chung, Tai-Yi Huang, Dept. of Comput. Sci., Nat. Tsing Hua Univ., Hsinchu, Taiwan.*

Article entitled "A Multiple LID Routing Scheme for Fat-Tree-Based InfiniBand Networks" by X. Lin, et al., Parallel and Distributed Processing Symposium dated Apr. 2004, 10 pages.

Article entitled "A Memory-Effective Routing Strategy for Regular Interconneciton Networks" by M.E. Gomez, et al., IEEE International Parallel and Distributed Processing Symposium dated Apr. 2005, 13 pages.

Article entitled "UNIX disk access patterns" by C. Ruemmler et al., Hewlett-Packard Laboratories, HP Laboratories Technical Report, dated Dec. 1992, 17 pages.

Website screen shot for Mellanox Technologies—Silicon Products; http://mellanox.com/products/silicon/php dated Feb. 4, 2008; 1 page.

Website screen shot for Myri-10G Overview; http://www.myri.com/Myri-10G/overview/ dated Feb. 4, 2008; 2 pages.

Website screen shot for Quadrics—QsNet High Performance Interconnect; http://www.quadrics.com/Quadrics/QuadricsHome.nsf/DisplayPages/3A912204F260 dated Feb. 4, 2008; 4 pages.

* cited by examiner

METHOD AND SWITCH FOR ROUTING DATA PACKETS IN INTERCONNECTION NETWORKS

FIELD OF THE INVENTION

The invention relates generally to the field of communications among processing elements of multiprocessors systems by means of multistage interconnection networks with a topology such as fat-tree. More particularly, the present invention refers to a method and a device for routing packets of information (data packets), either following an adaptive routing scheme or according to a deterministic routing strategy, through this kind of high-performance networks for massively parallel processing architectures.

BACKGROUND OF THE INVENTION

Historically used only in high-end supercomputers, interconnection networks are now found in systems of all sizes and all types: from large supercomputers to small embedded systems-on-a-chip (SoC) and from inter-processor networks to router fabrics. Indeed, as system complexity and integration continues to increase, many designers are finding in the interconnection networks technology more efficient ways to route packets and economic solutions to build computer clusters.

Interconnection networks for supercomputers in general, and particularly for recent massively parallel computing systems based on computer clusters, demand high performance requirements. The fundamental topics in the design of interconnection networks that determine the performance tradeoffs are: topology, routing, and flow-control.

Interconnection networks are built up of switching elements and topology is the pattern in which the individual switches are connected to other elements, like processors, memories and other switches. Among the known topologies, fat-trees have raised in popularity in the past few years and are used in many commercial high-performance switch-based point-to-point interconnects: for instance, InfiniBand connectivity products supplied by Mellanox Technologies (www.mellanox.com), Myrinet by Myricom (www.myri.com) and the networking products developed by Quadrics (www.quadrics.com).

Fat-tree topology is a particular case of a multistage interconnection/switching network, that is, a regular topology in which switches are identical and organized as a set of stages. Each stage is only connected to the previous and the next stage using regular connection patterns. A fat-tree topology is based on a complete tree: a set of processors is located at the leaves and each edge of the tree corresponds to a bidirectional channel. Unlike traditional trees, a fat-tree gets thicker near the root. In order not to increase the degree of the switches as they go nearer to the root, which makes the physical implementation unfeasible, an alternative implementation is the k-ary n-tree. In what follows, the term fat-tree also refers to k-ary n-trees.

A k-ary n-tree is composed of $N=k^n$ processing nodes and $nk^{n-1}$ switches with a constant degree $k \geq 1$: each switch has 2k input ports and 2k outputs ports, being k of them ascending ports (through which the switch is connected to a next stage switch) and k descending ports (through which the switch is connected to a previous stage switch). Each processing node is represented as a n-tuple $\{0, 1, \ldots k-1\}^n$ and each switch is defined as a pair $<s, o>$, being $s \in \{0 \ldots (n-1)\}$ the stage at which the switch is located and stage $\mathbf{0}$ is considered as the closest one to the processing nodes, and o is a (n−1)-tuple $\{0, 1, \ldots, k-1\}^{n-1}$. In a fat-tree, two switches $<s, o_{n-2}, \ldots, o_1,$ $o_0>$ and $<s', o'_{n-2}, \ldots, o'_1, o'_0>$ are connected by an edge, if and only if $s'=s+1$ and $o_i=o'_i$ for all $i \neq s$. On the other hand, there is an edge between the switch $<0, o_{n-2}, \ldots, o_1, o_0>$ and a processing node, represented the processing node as a series of n links: $p_{n-1}, \ldots, p_1, p_0$, if and only if $o_i=p_{i+1}$ for all $i \in \{n-2, \ldots, 1, 0\}$. Descending links of each switch will be labelled from 0 to k−1, and ascending links from k to 2k−1.

Routing is one of the most important design issues of interconnection networks. Routing schemes can be mainly classified as source and distributed routing. In source routing the entire path to the destination is known to the sender of a packet, so that the sender can specify the route, when sending data, which the packet takes through the network. Source routing is used in some networks, for instance in Myrinet, because routers are very simple. On the other hand, distributed routing allows more flexibility, but the routers are more complex. Distributed routing can be implemented by a fixed hardware specific to a routing function on a given topology, or by using forwarding tables that are very flexible but suffer from a lack of scalability. Examples of commercial interconnection networks using distributed routing are InfiniBand and Quadrics.

For both source and distributed routing, the routing strategy determines the path that each packet follows between a source-destination pair, performing adaptive or, otherwise, deterministic strategies or a combination of both. In deterministic routing, an injected packet traverses a fixed, predetermined, path between source and destination; while in adaptive routing schemes the packet may traverse one of the different alternative paths available from the packet source to its destination. Adaptive routing takes into account the status of the network when taking the routing decisions and usually better balances network traffic, and so this allows the network to obtain a higher throughput, however out-of-order packet delivery may be introduced, which is unacceptable for some applications. Deterministic routing algorithms usually do a very poor job balancing traffic among the network links, but they are usually easier to implement, easier to be deadlock-free and guarantee in-order delivery.

An adaptive routing algorithm is composed of the routing and selection functions. The routing function supplies a set of output channels based on the current and destination nodes. The selection function selects an output channel from the set of channels supplied by the routing function. For example, the selection function may choose at each stage the link with the lowest traffic load.

Routing in fat-trees is composed of two phases: an adaptive upwards phase and a deterministic downwards phase. The unique downwards path to the destination depends on the switch that has been reached in the upwards phase. In fat-trees, the decisions made in the upwards phase by the selection function can be critical, since it determines the switch reached in the ascending path and, hence, the unique downwards path to the destination. Therefore, the selection function in fat-trees has a strong impact on network performance.

A distributed deterministic routing strategy is implemented, for example, in InfiniBand, thus there is only one route per source-destination pair. Nonetheless, InfiniBand offers the possibility to use virtual destinations and there can be a plurality of virtual destinations corresponding to a real destination, allowing the traffic to be distributed through different adaptive routes determined between the source and each virtual destination, for the same source-destination pair. A sever drawback of this proposal [see "A Multiple LID Routing Scheme for Fat-Tree-Based InfiniBand Networks" by X. Lin, Y. Chung, and T. Huang, Parallel and Distributed Processing Symposium, April 2004], and in general of adaptive routing, is suffered when a given destination is congested, because the traffic keeps on being spread along the different adaptive routes, contributing to overall network congestion.

SUMMARY OF THE INVENTION

The present invention is intended to resolve the problem outlined above on, keeping network congestion restrained to a minimum part of the multistage interconnection network, by determining routes from a source which are as disjointed between different destinations as possible and thus, in case packet congestion happens to a given destination, the resting destinations are affected to a minimum. Also, another purpose of the invention is to balance the link utilization in upwards phase as well as in downwards phase of routing in fat-trees.

This invention can be applied for both source and distributed routing, and so it can be used in any of the high-performance networks for interconnection, included commercial interconnection networks such as the ones cited in prior-art: Myrinet (source routing), InfiniBand and Quadrics (distributed routing), etc.

In case of source routing, the present invention implements a deterministic routing strategy. In case of distributed routing, the present invention implements either a selection function of an adaptive routing scheme or also a deterministic routing algorithm.

One aspect of the invention deals with a method for routing data packets in multistage interconnection networks. In particular, the method selects an ascending output port for each switch of the network when a data packet is routed in the upwards phase. The selected output port can be used as a unique option for routing data packets through the switch, determining a unique route per source-destination pair, formed the route with all the selected output ports in the way proposed below and thus deterministic routing is obtained. Another alternative offered by this invention is to use the selected output port as a default option, the preferred output port given as result by the selection function of the adaptive routing, selecting another output port available in the switch if the preferred output port is busy.

The commonly-used routing algorithm is adaptive in the upwards phase and deterministic in the downwards phase. In the upwards phase a selection function is used to select the output port finally used. In the downwards phase, the output port to be used in each switch is selected using the component of the destination address corresponding to the stage of the current switch.

The present proposal consists of a selection function and a deterministic routing algorithm for the upwards phase, remaining the same the downwards phase. This is done by proposing a method for selecting the output port to use in each switch in the upwards phase of a packet. The selection of the output port (the preferred output port for adaptive routing and the unique output port for deterministic routing) from the k available ascending output ports of a switch $<s, o_{n-2}, \ldots, o_1, o_0>$ is proposed by considering the $s^{th}$ component of the destination address of the data packet, being s the stage at which the switch belongs to within the multistage interconnection network and the destination address identified by a n-tuple $(p_{n-1}, \ldots, p_1, p_0) = \{0, 1, \ldots k-1\}^n$ corresponding to one of the $k^n$ processing nodes in the network, being $n \geq 2$, $k \geq 1$ and $0 \leq p_i < k$. The available output ports, which in the upwards phase are ascending ports in the tree, are labelled from k to 2k−1 for each one of the $nk^{n-1}$ switches in the multistage network and the stage $s \in \{0 \ldots (n-1)\}$. The selection of the output port here proposed takes into account both the stage of the switch and the component of the packet destination corresponding to said stage. That is, for a packet with destination address $(p_{n-1}, \ldots, p_1, p_0)$ at the switch $<s, o_{n-2}, \ldots, o_1, o_0>$ the physical link (associated to an output port of the switch) which the highest priority is assigned to is the one corresponding to the label $k+p_s$.

As a consequence, each switch located at the top of the tree concentrates traffic destined to all processors whose identifiers differ only by the most significant digit. Indeed, the paths to these destinations are disjoint, as each one is reachable through different output ports of the switch.

Packets are classified according to their destination considering all the components of their respective destination addresses. On the other hand, only those packets that share the first switch and are destined to the same node also share all the preferred links along the complete upwards phase.

The method presented above provides a preferred output port associated to an ascending link, numbered as i, in the upwards phase. This preferred output port can be used as the selected output port to be the only one for deterministic routing; whilst in adaptive routing, when this port/link is not free, this method further selects an alternative output port, for example performing a linear rotative search starting at link with number i+1 until it finds a free link, if any, and sets the first free port found as the selected output port to use for sending the packet.

Another aspect of the invention is a switch incorporating the hardware that implements the described method. This switch has a plurality of ports, 2k input ports and 2k outputs ports, and it comprises storage means for the data packets received through one of the 2k input ports and selection means for routing the stored packets, in a source or a distributed routing scheme and following either an adaptive or a deterministic strategy. The hardware that constitutes said selection means comprises a programmable priority encoder configured to take the preferred link as an extra input and programmed to execute a search, for example a linear rotative search, so that, taking into account the set of physical links and the physical link that is preferred, the priority encoder can change the order of the set of physical links at the switch in order to put the preferred one in the first position. The selection means further comprises a multiplexer whose output is connected to the extra input of programmable priority encoder in order to output a component of the destination address of the stored packet into the programmable priority encoder, according to the method described before, i.e., the component that corresponds to the stage of the network at which the switch is to be located.

According to a still further aspect of the invention, an interconnection network comprising a plurality of switches, and being at least a switch as described above, which are interconnected among them in a topology such as a fat-tree/k-ary n-tree, and at least one switch can be connected to at least one processing node, which can be identified by an address consisting of a plurality (n) of components $(p_{n-1}, \ldots, p_1, p_0)$ forming a n-tuple.

There are several advantages offered by the invention:

Versatility, as source routing as well as distributed routing can be performed, and is applicable to commercial switches, allowing scalability both in memory and routing time because no forwarding tables are needed.

Being used in fat-trees, a deterministic routing strategy can be carried out efficiently according to the proposed method and, being used as a selection function, the adaptive routing strategy commonly used for this topology can be easily implemented.

When used for deterministic routing, all the advantages of this strategy are kept up and the disadvantages of low performance are cleared, offering in-order delivery of packets and simple implementation, since neither selection function nor additional hardware resources to ensure in-order delivery are needed.

When used for adaptive routing, the time taken for a packet to reach the destination (communication latency) is reduced and the network productivity measured as the rate of packets processed by the interconnection network is improved.

Complete balance of the packet traffic is attained both in the upwards and in the downwards phase, which achieves to reduce network congestion due to busy destinations and allows to optimize the cost-performance commitment in the network planning and deployment.

—Conventional techniques used for implementing commonly-used routing algorithms in meshes and tori networks, such as the Flexible Interval Routing (FIR) [see "A Memory-Effective Routing Strategy for Regular Interconnection Networks" by M. E. Gómez, P. López, and J. Duato, IEEE International Parallel and Distributed Processing Symposium, April 2005] can be applied to ease the implementation of this invention for putting it into practice as either adaptive or deterministic routing.

Additional advantages and features of this invention will be apparent in view of the following detailed description and appended drawings.

BRIEF DESCRIPTION OF THE DRAWINGS

To complete the description being made and to assist in a better understanding of the characteristics of the invention, in accordance with a preferred example of practical embodiment, this description is accompanied, as an integral part of the same, with a set of drawings which illustrates but does not restrict, in which the following has been represented.

DETAILED DESCRIPTION OF THE INVENTION

Figure 1:
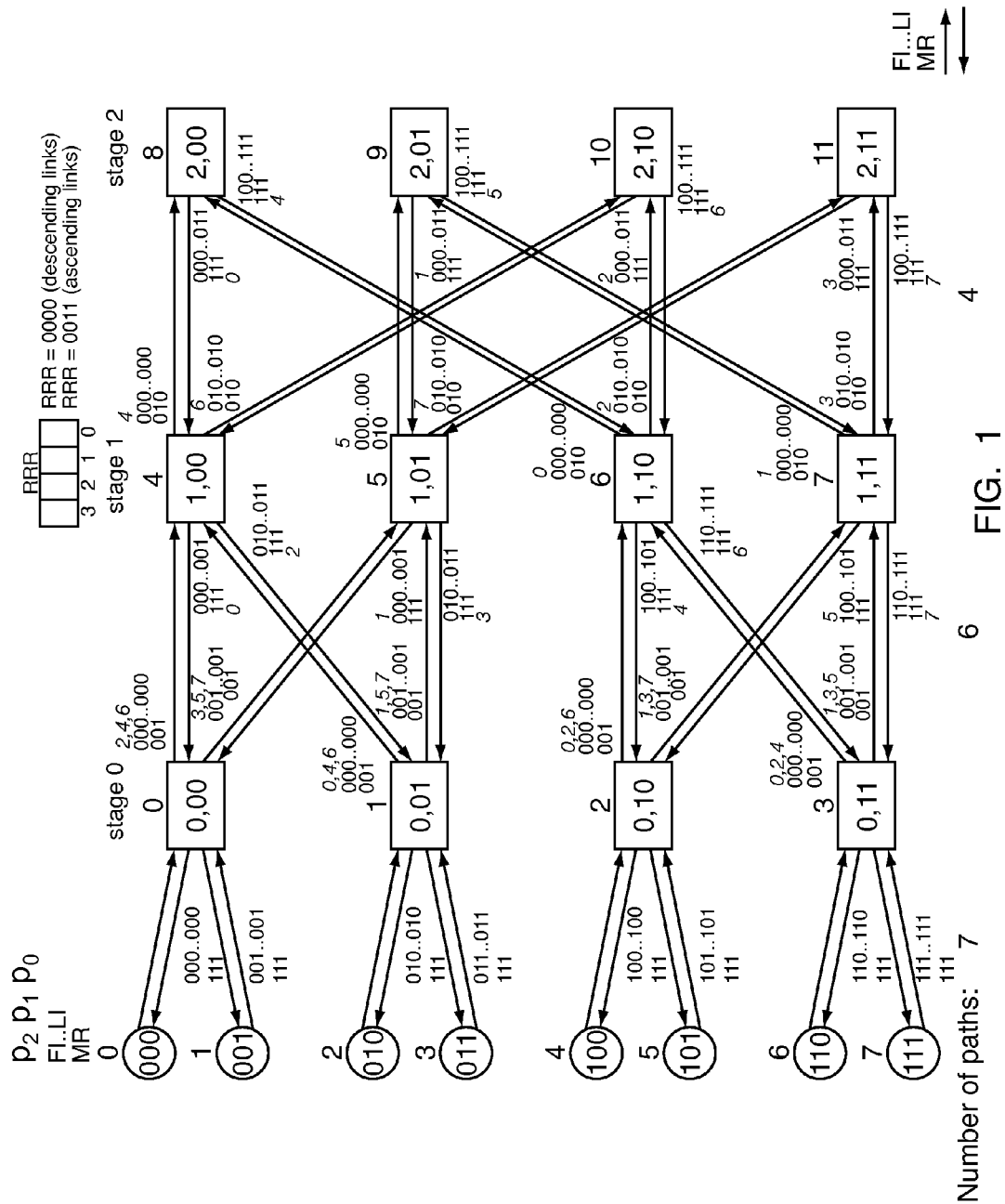
FIG. 1 shows a 2-ary 3-tree in which routing is implemented with FIR registers, according to a possible embodiment of the invention with adaptive routing.

In the light of FIG. 1, it is possible to describe two alternative embodiments of the invention: one disclosed here firstly deals with a deterministic routing method for fat-trees and a second one refers to a selection function which is here called Stage And Destination Priority (SADP) selection function for adaptive routing.

An efficient mechanism to reduce the multiple ascending paths in a fat-tree into a single one for each source-destination pair is proposed. The path reduction is done by balancing network link utilization: All the links of a given stage must be used by a similar number of paths. A simple idea is to divide the adaptive up interval of a switch into a number (k) of sub-intervals with the same size in order to get balance in the ascending phase, but this does not guarantee at all that the descending links are well balanced. The deterministic routing method for fat-trees defined according to the object of this invention allows to balance both routing phases by shuffling, at each switch, consecutive destinations in the ascending phase; in other words, consecutive destinations are distributed among the different ascending links, reaching different switches in the next stage.

This mechanism is explained using an example illustrated in FIG. 1, which shows the destination node distribution in the ascending and descending links of a 2-ary 3-tree, wherein each ascending link has been labelled—in italic—with the destinations whose packets will be forwarded through said link. Destinations are processing nodes drawn in FIG. 1 as circles, connected to switches, the rectangular elements of FIG. 1, which are in turn connected in the fat-tree topology, 2-ary 3-tree in this example.

In the first stage (stage 0) of the network, consecutive destinations are shuffled between the two up links. To do that, the least significant component—the least significant bit, in this case: K=2—of the packet destination address is used to select the ascending output port. That is, packets that must be forwarded upwards select the ascending output port indicated by the least significant component of the packet destination ($p_0$). Therefore, packets with consecutive destinations are sent to different switches in the next stage. At the second stage (stage 1), all the packets that reach a switch have the same least significant component in their destination. Hence the component to consider in the selection of the ascending output port in this stage is the following one in the destination address. For instance, at switch 4, only packets destined to nodes 0, 2, 4 and 6 reach that switch and only packets destined to nodes 4 and 6 must be forwarded upwards. Packets destined to node 4 select the first up link and packets destined to node 6 the other one. Considering all the switches of stage 1, packets destined to nodes 0, 1, 4 and 5 use the first up output port of the switches and those packets destined to nodes 2, 3, 6 and 7 use the second output port. That is, the second least significant component ($p_1$) of the packet destination is used. This mechanism distributes the traffic destined to different nodes, as shown in FIG. 1: packets destined to the same node reach the same switch at the last stage independently of their source node. Each switch of the last stage receives packets addressed only to two destinations and packets destined to each one are forwarded through a different descending link. At the bottom of FIG. 1 the number of paths are shown, i.e., the number of source-destination pairs that make use of each link at each stage. Both, the ascending and descending links of a given stage are used by the same number of paths. So, traffic in the network is completely balanced.

Another preferred embodiment of the invention is to implement the Stage And Destination Priority (SADP) selection function for commonly-used adaptive routing in fat-trees, In order to evaluate network performance using this strategy and to compare with different selection functions included here, a detailed event-driven simulator has been implemented, which models diverse k-ary n-tree with adaptive routing and virtual cut-through switching, and the results from simulations are shown in FIGS. 2-7.

Every selection function as defined as follows takes into account the state of the output physical link offered by the routing function and then applies some criteria to select one of them. All the selection functions can be implemented in two steps: the first one to obtain the preferred link, and the second implements the linear rotative search by using a programmable priority encoder which takes the preferred link as an extra input and gives the highest priority to the input represented by this value. The first step changes according to the particular selection function to be implemented, taking into account the set of physical links and the physical link that is preferred, since the order of the set of physical links is changed in order to put the preferred one in the first position.

According to the object of the invention, the so-called Stage And Destination Priority (SADP) selection function takes into account both the stage at which the switch belongs to and the component of the packet destination corresponding to that stage, hence, a switch located at a stage (s) considers the $s^{th}$ component of the destination address. As a consequence, each switch located at the top of the tree concentrates traffic destined to all processors whose respective addresses differ only by the most significant digit and so the paths to these destinations are disjoint. A multiplexer can select the corresponding component of the packet destination at each stage to output it to the programmable priority encoder.

The following selection functions can be compared with the one proposed above:

First Free (FF): The FF selection function selects the first physical link which has free space. It uses a lineal search, starting at the first ascending physical link. Having the ascending links labelled from k to 2k−1, the $k^{th}$ port is selected. FF can be implemented by using a plain priority encoder.

Static Switch Priority (SSP): The SSP selection function assigns in each switch at a given stage the highest priority to a different ascending link. Thus a disjoint high priority ascending path is created for each switch of the first stage. Hence, packets coming from different switches at the first stage reach different switches at the last one, resulting in balancing the traffic. The high priority physical link for the switch $<s, o_{n-2}, \ldots, o_1, o_0>$ is the ascending link labelled as $k+o_s$. SSP needs the hardware mentioned above, connecting the switch component $<o_s>$ to the programmable priority encoder.

Static Destination Priority (SDP): The SDP selection function assigns priorities to physical links at each switch depending only on the packet destination. The preferred physical link is given by the least significant component of the packet destination, which represents the port that the destination is attached to in the first stage. That is, a packet sent to a processing node with destination address $(p_{n-1}, \ldots, p_1, p_0)$ has as the preferred link the $k+p_0$ link. Therefore, the ascending paths of two packets with respective destination addresses $(p_{n-1}, \ldots, p_1, p_0)$ and $(p'_{n-1}, \ldots, p'_1, p'_0)$ are not disjoint only if $p_0=p'_0$. The main difference between SADP and SDP selection functions is that in SDP packets destined to different nodes can have the same preferred links if their destination nodes have the same least significant component ($p_0$). SADP takes into account all the components of the destination addresses and not only the last one component as SDP does. SDP uses the last component of the packet destination to control the programmable priority encoder Static Origin Priority (SOP): The SOP selection function assigns priorities to physical links depending only on the packet source. The preferred physical link is given by the least significant component of the packet source, which represents the port that the origin is attached to in the first stage. That is, for a packet sent from processing node $(p_{n-1}, \ldots, p_1, p_0)$, the preferred link is k+p0. The hardware implementation of SOP is the same as SDP, but connecting the last component of the packet source to the programmable priority encoder.

More Credits (MC): Having credits employed to implement the flow control mechanism, the MC selection function selects the link which has the highest number of credits available. This number is determined by the sum of the credits available in the all the virtual channels of the physical link. The implementation of MC is more complex, as it needs several comparators to select the link with more available credits.

Cyclic Priority (CP): The CP selection function uses a round robin algorithm to choose a different physical link each time a packet is forwarded. The implementation of CP needs a counter that is incremented each time a packet is routed. The counter is connected to the programmable priority encoder.

Random Priority (RP): The CP selection function selects a random physical link each time a packet is transmitted. This function obtained similar performance results as CP. This is due to the fact that with a high number of packets to transmit, CP and RP select each physical link the same number of times without considering the source or destination of the packets. The implementation of RP is complex, because it is difficult to obtain by hardware a truly random number generator.

A wide range of k-ary-n-tree topologies have been simulated to evaluate the different aforementioned selection functions. Several simulations have been carried out assuming that it takes 20 clock cycles to apply the routing algorithm and the selection function. The switch and link bandwidth has been assumed to be one flit per clock cycle and fly time through the link has been assumed to be 8 clock cycles. Credits are used to implement the flow control mechanism. Each physical input port can be multiplexed into up to 3 virtual channels, with space to store two packets. Also, each output port link has a two-packet output buffer. Packet size is 8 Kb and packet generation rate is constant and the same for all the processors in the network. Three different packet traffic patterns are considered by the simulator: uniform, hot-spot and complement. In the uniform traffic pattern, message destination is randomly chosen among all the processors in the network, in the hot-spot traffic a fixed percentage of the traffic is sent to a particular destination, while in the complement traffic pattern each processor sends all its messages to the opposite node. This network configuration parameters and network load are an example for simulation purpose but the invention is valid for others.

Figure 2:
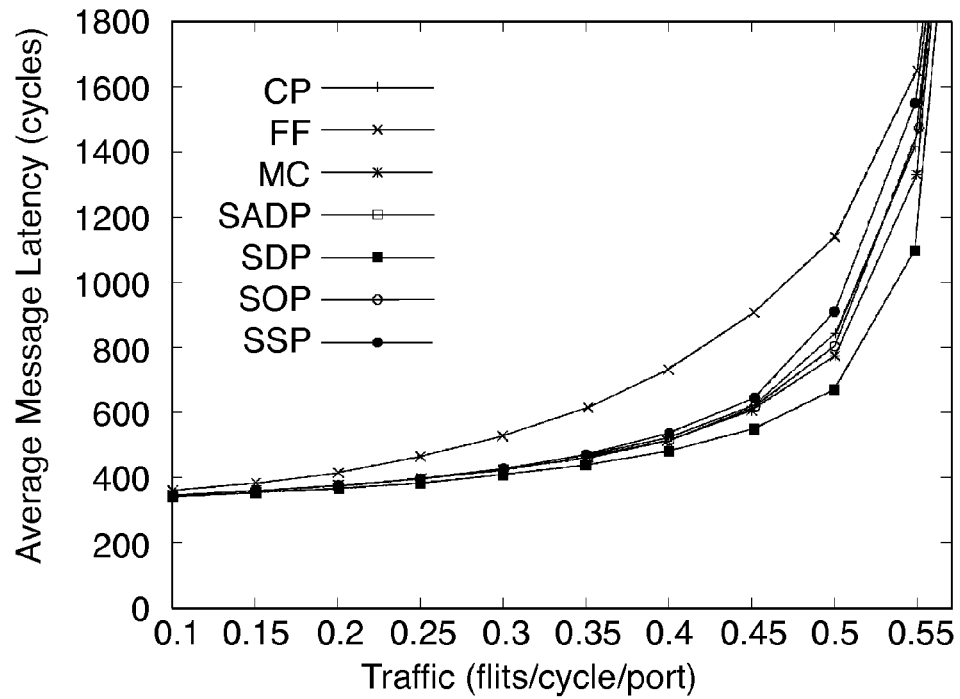
FIG. 2 shows for different proposed selection functions a graphical representation of the average message latency versus traffic for uniform traffic pattern in a simulated 4-ary 2-tree with adaptive routing.

FIG. 2 shows results for a very small network, a 4-ary 2-tree, consisting of 16 nodes. The behaviour of the selection functions is not very different, with the exception of FF. FF always returns the same preferred ascending link, therefore an ascending path needs to be saturated before another one is selected. Hence, there is a real unbalanced link utilization as those that belong to the preferred ascending paths always have a higher utilization than the others. On the other hand, due to the fact that in this example there are only two stages, the rest of selection functions have almost the same performance, because with a low number of stages there is a low number of different paths that can be chosen to reach any destination.

Figure 3:
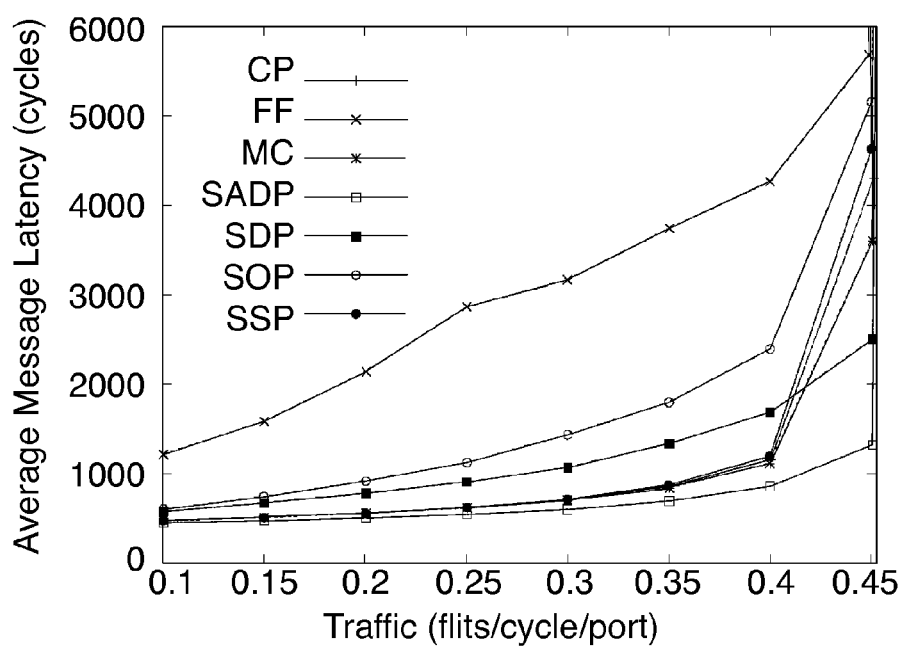
FIG. 3 shows for different proposed selection functions a graphical representation of the average message latency versus traffic with uniform traffic pattern in a simulated 4-ary 4-tree with adaptive routing.

FIG. 3 shows the results for a 4-ary 4-tree, with 256 nodes and four stages. In this case, involving more stages, there are more differences in packet latency for the different selection functions. Despite SOP and SDP achieve a better performance than FF, they still have a high network latency. Their main drawback is that they select paths based only on the $p_0$ component of the packet origin in SOP, or destination in SDP. Therefore, the probability of obtaining disjoint paths and, thus, an even network utilization is quite low. On the other hand, CP, SSP and MC have almost the same performance, because they do a good job balancing the network utilization. However, in CP and MC there is not any mechanism to try avoiding that the ascending paths of packets cross each other. In SSP, each switch at each stage tries to send the ascending traffic to a different switch, but it does not take into account the destination of packets. Hence, the ascending paths of packets with different origin and destination processing nodes may cross. SADP achieves the best performance because, assuming that the preferred ascending path is free, only the ascending paths of packets sent to the same destination will cross each other.

Figure 4:
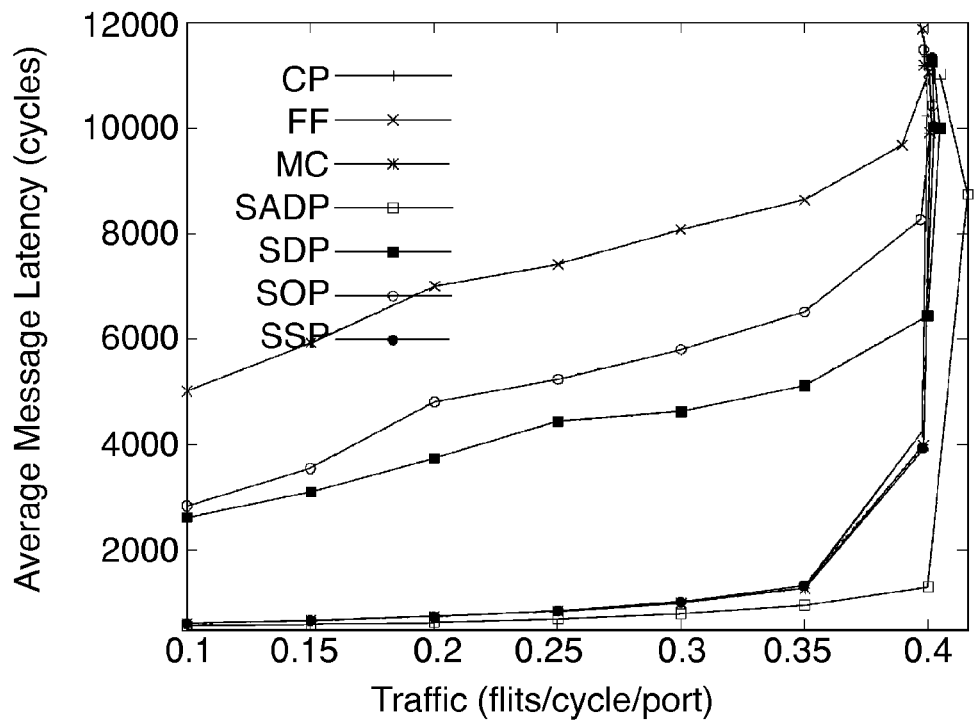
FIG. 4 shows for different proposed selection functions a graphical representation of the average message latency versus traffic for uniform traffic pattern in a simulated 4-ary 6-tree with one virtual channel with adaptive routing.

FIG. 4 shows results for a larger network, a 4-ary 6-tree. In this case, the differences among selection functions are higher. This is due to the fact that with more stages, there are more different ascending paths to choose from, therefore more opportunities to balance traffic. On the other hand, the selection functions with a poor traffic balance achieve even worse results than in the previous examples.

Figure 5:
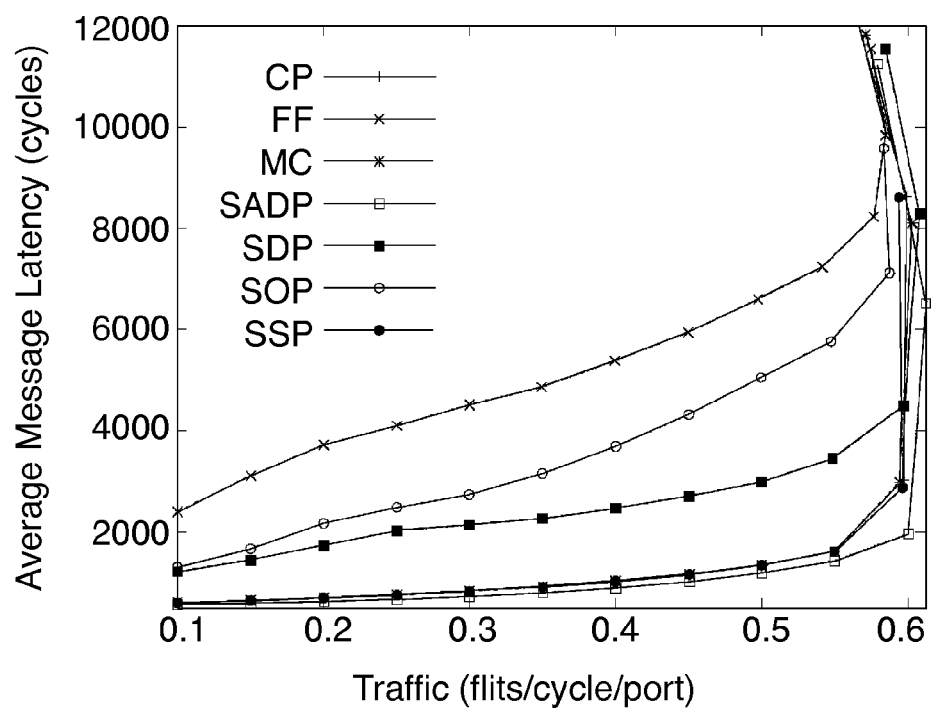
FIG. 5 shows for different proposed selection functions a graphical representation of the average message latency versus traffic for uniform traffic pattern in a simulated 4-ary 6-tree with three virtual channels with adaptive routing.

FIG. 5 shows the effects of using virtual channel multiplexing. The use of virtual channels reduces the effect of the head-of-line blocking. By using three virtual channels, in the 4-ary 6-tree of the example, all the selection functions have a better performance, but it is also important to balance network traffic. Although all the selection functions benefits from the use of virtual channels, the ones that have a balanced use of the links give better results than the other ones.

Figure 6:
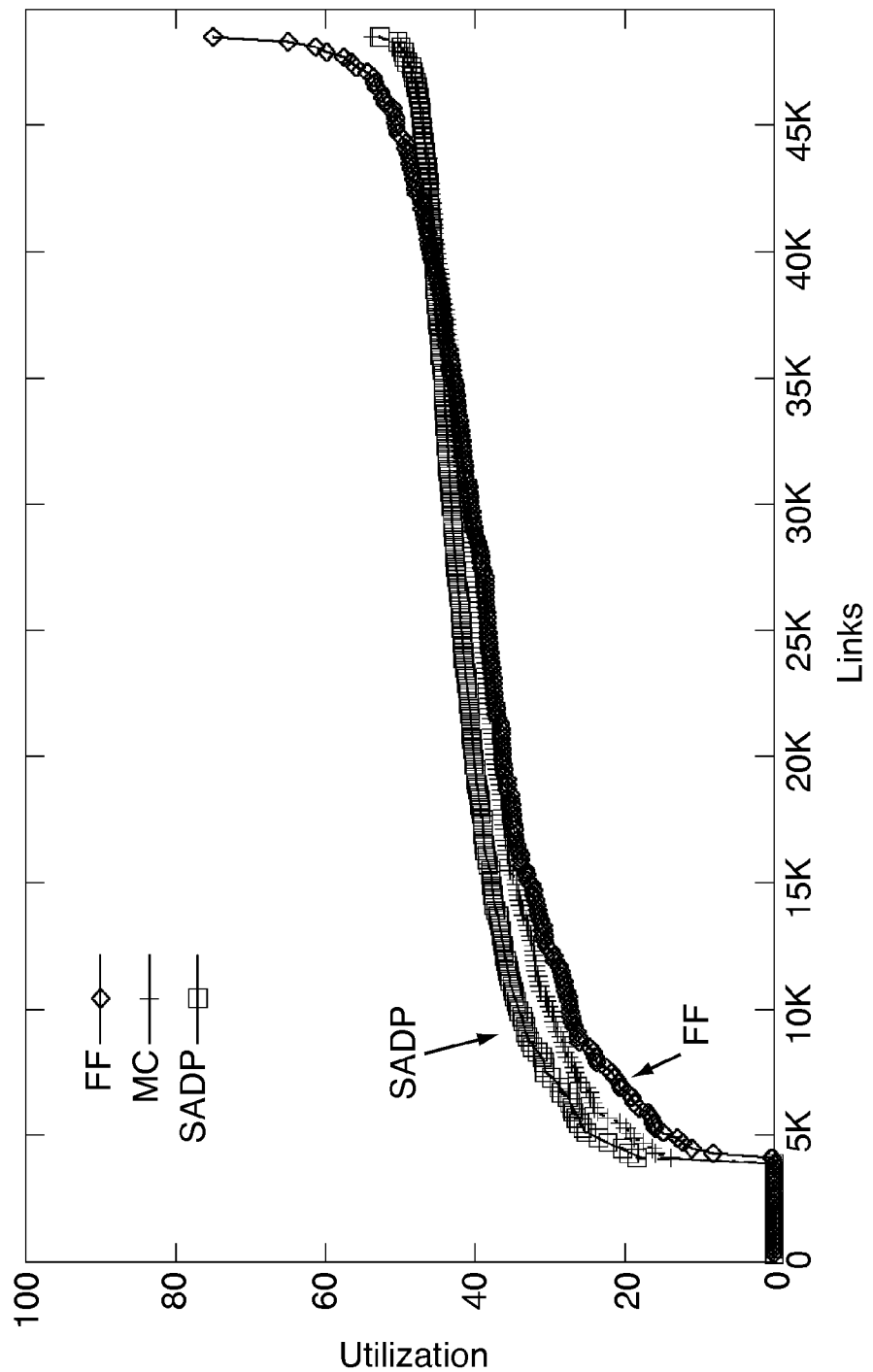
FIG. 6 shows for different proposed selection functions a graphical representation of the link utilization at saturation in a simulated 4-ary 6-tree with adaptive routing for uniform traffic.

FIG. 6 shows the utilization of network links for uniform traffic pattern when injecting traffic at the saturation rate of each selection function. The selection functions that better balances traffic are the ones that obtains the best performance.

Figure 7:
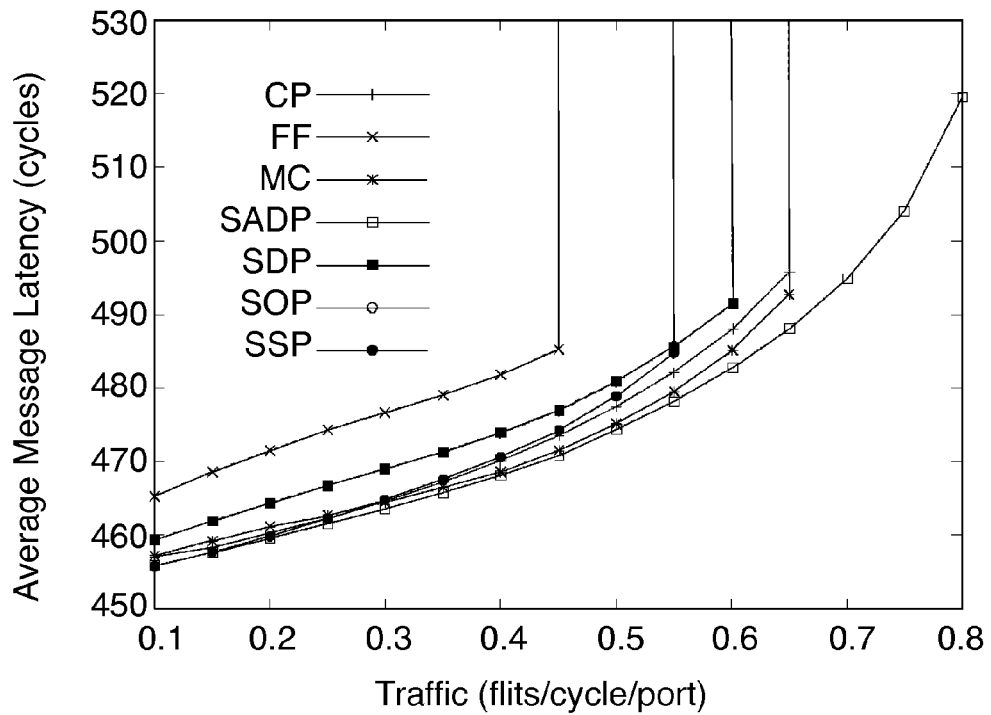
FIG. 7 shows for different proposed selection functions a graphical representation of the average message latency versus accepted traffic in a simulated 4-ary 4-tree with adaptive routing for complement traffic.

FIG. 7 shows the performance of the selection functions for complement traffic pattern in a medium sized network, a 4-ary 4-tree. FF has the worst performance. SOP and SDP with complement traffic have worse performance than the one obtained with uniform traffic, because they concentrates in the same switch of the last stage all the packets with the same least significant component of the packet source or destination, and in the complement traffic pattern all the packets reach the last stage. SSP with complement traffic also shows worse performance, since in SSP the chosen link does not depend on the source or destination node. Therefore, packets with different destinations cross each other. Both CP and MC, which dynamically balance the link utilization without the use of preferred paths, achieve a good performance with complement traffic. MC has a better performance than CP because it takes into account the current number of credits of the link, and this allows MC to select the links that are less saturated. SADP shows the best performance of all and a good balance on link utilization, since with SADP the preferred ascending path of two packets only can cross each other if the packets have the same destination and in the complement traffic pattern, every packet sent from a different node has a different destination.

From the results of all the simulations, SADP provides an efficient way to balance the utilization of the links by correctly choosing ascending paths, because it chooses the preferred path in a manner so that the ascending paths of two packets only can cross each other if the packets have the same origin switch or destination node. This provides a balance of link utilization even better than the one provided by MC. For example, a 4-ary-6 with uniform traffic using SADP as selection function reaches, for a medium network load, a 24.53% lower latency than the same fat-tree using MC and the latter has a more complex implementation. Comparing SADP with the simplest selection function FF, SADP decreases latency by a factor of 8.9.

With regards to the impact of the arity k of the tree on performance, the difference among the evaluated selection functions keeps qualitatively the same. This is due to the fact that the impact of any selection function is greater when there is a high number on stages.

Figure 8:
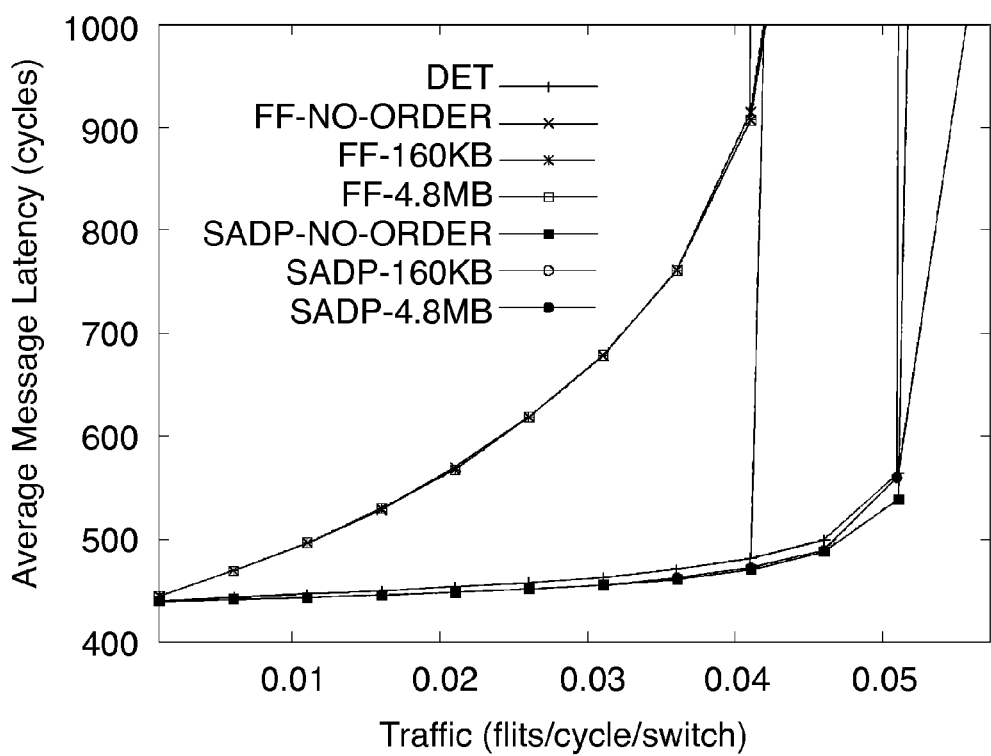
FIG. 8 shows for different selection functions and the deterministic routing a graphical representation of the average message latency versus accepted traffic in a simulated 4-ary 4-tree with 5% hot-spot traffic.
Figure 9:
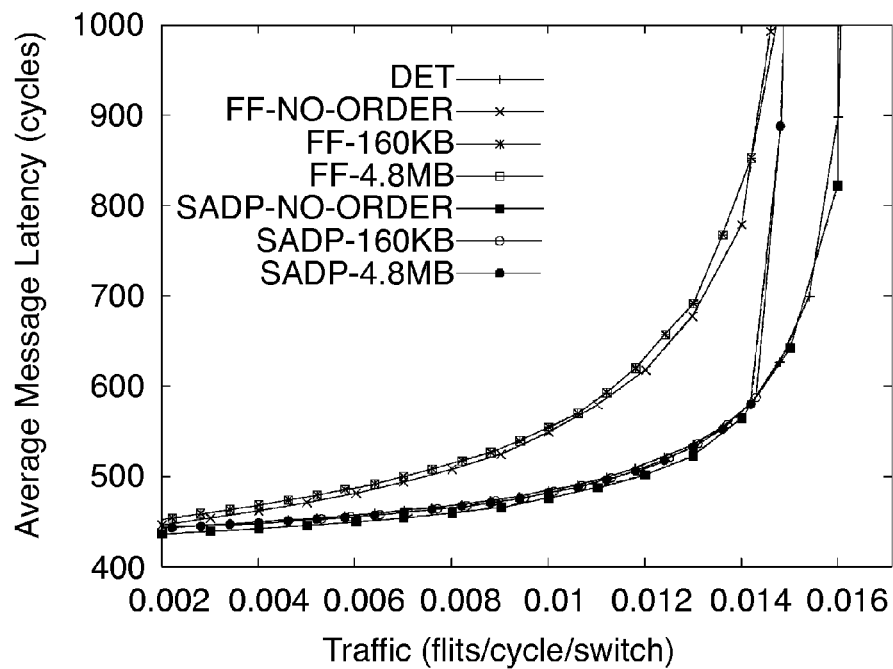
FIG. 9 shows for different selection functions and the deterministic routing a graphical representation of the average message latency versus accepted traffic in a simulated 4-ary 4-tree with 20% hot-spot traffic.

For comparison between the deterministic routing (DET) presented as the first embodiment and the adaptive routing with the SADP selection function as the second embodiment of the invention, simulations considering hot-spot traffic patterns have been performed and the results are shown in FIGS. 8-9.

A basic approach to ensure in-order delivery with the adaptive routing algorithm is implemented by using a reorder-buffer at the destination node to store out-of-order packets. Different buffer sizes of the reorder-buffer can be used. Every time a packet is sent, its sequence number is included in its header. When a packet arrives out of order at the destination, it is stored in the reorder-buffer to wait for all packets with smaller sequence number. On the other hand, to prevent unnecessary packet retransmission, the source node does not inject packets if the destination buffer does not have enough free space to store all the packets that have been sent previously. This complicates the adaptive routing implementation, as a reorder-buffer is required at the destination and end-to-end flow control is needed.

FIG. 8 shows the performance results for hot-spot traffic pattern in a 4-ary 4-tree, wherein one random destination receives 5% of the traffic. In this case, deterministic routing obtains a slightly higher throughput than the adaptive ones when guaranteeing in-order delivery. In adaptive routing, when the preferred ascending link of a packet is not available, that packet is routed using another one, spreading the congestion to all the different alternative paths. However, with deterministic routing, when this ascending link has not buffer space left or is not available, that packet is stopped until it becomes available. So, in the deterministic routing algorithm, that congestion is not spread. The congestion only affects to the different paths that share links, and in the deterministic algorithm, the number of paths that share the same link is minimized.

FIG. 9 shows the performance results for hot-spot traffic pattern in a 4-ary 4-tree, when the hot-spot destination node receives 20% of the traffic. All the routing algorithms depicted obtain a very low performance. Anyway, deterministic is not worse than the adaptive ones. The SADP selection function in adaptive routing gives preference, among all the ascending links of a switch, to the same one obtained by applying the deterministic routing (DET), only if this output port does not have free space, then another one is selected instead of the preferred link by SADP.

FIGS. 8 and 9 also show the performance for hot-spot traffic patterns when in-order delivery is not required. The performance results obtained are similar to the ones obtained when in-order delivery is required, because the key issue here is not the number of out-of-order packets received, but the fast congestion of the network. For SADP, when a low buffer size is used the performance achieved by the network is fairly smaller.

Figure 10:
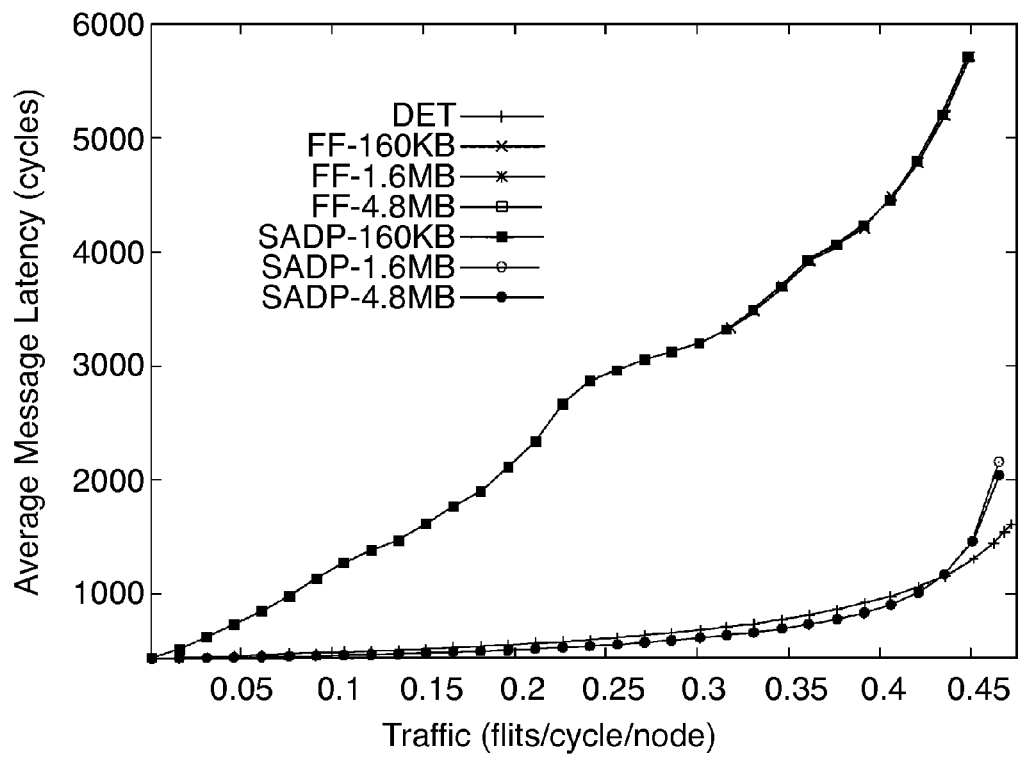
FIG. 10 shows for different selection functions and the deterministic routing a graphical representation of the average message latency versus accepted traffic in a simulated 4-ary 4-tree with uniform traffic.

In regards to the uniform traffic pattern, FIG. 10 plots the average packet network latency versus the average accepted traffic for a 4-ary 4-tree with the uniform traffic pattern, without guaranteeing in-order packet delivery and guaranteeing in-order packet delivery using different reorder-buffer sizes in the adaptive case. In deterministic routing, in-order delivery is ensured by design. The deterministic routing proposed here strongly outperforms adaptive routing with the FF selection function and obtains roughly the same throughput than the adaptive routing algorithm when using the SADP selection function, which is the one that provides the best results in this case. For the uniform traffic pattern, almost all the packets are delivered with the correct order, because traffic rate is distributed among all destinations. This is why similar performance results are obtained for all the different reorder-buffer sizes in the adaptive case. However, deterministic routing obtains a slightly higher latency than the adaptive one, because deterministic routing only can use one ascending link for a given packet, so it forces the packet to wait until it is available. On the other hand, near the saturation point, the network latency is smaller for the deterministic routing, because it classifies network traffic, thus reducing contention.

In order to analyze further the performance of deterministic routing, a more realistic traffic pattern has been used in simulations, particularly I/O traces provided by Hewlett-Packard Labs [see "Unix Disk Access Patterns" by C. Ruemmler, J. Wilkes. Winter Usenix Conference, January 1993] are simulated in a 2-ary 7-tree and different time compression factors have been applied to the traces.

Figure 11:
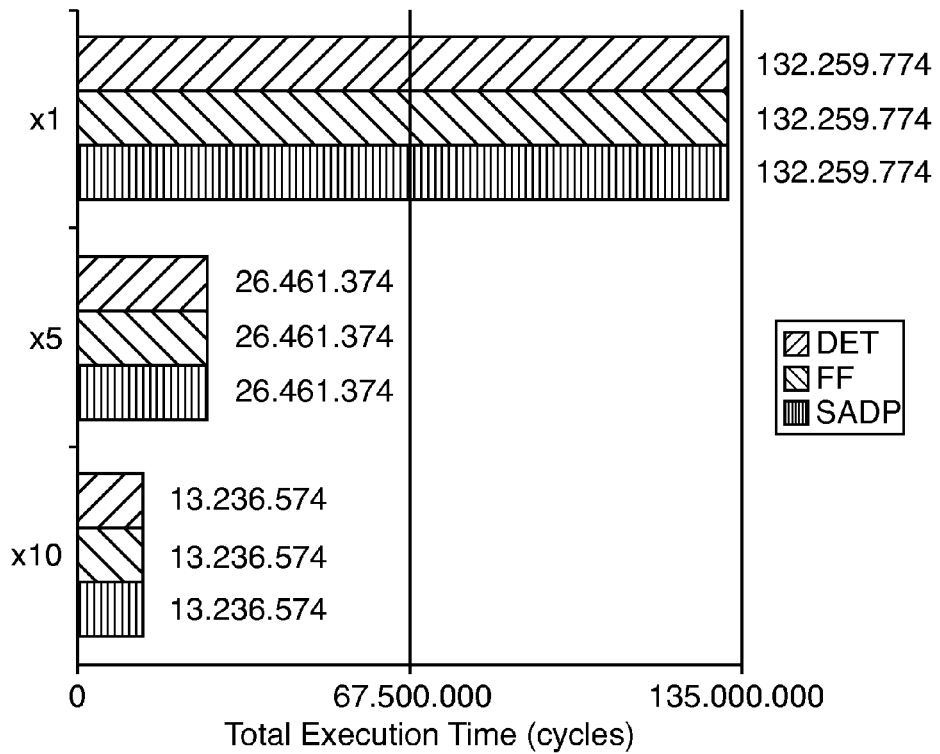
FIG. 11 shows for different selection functions and the deterministic routing a bar diagram of the total execution time for traces with different compression factors in a simulated 2-ary 7-tree without in-order delivery.

FIG. 11 shows the time required to deliver all the packets included in the trace when there is no need to ensure in-order delivery at different compression factors: 1, 5 and 10. As it can be observed, there are no differences between the routing algorithms, and it does not matter the selection function used, because the network is able to deal with the injected traffic.

Figure 12:
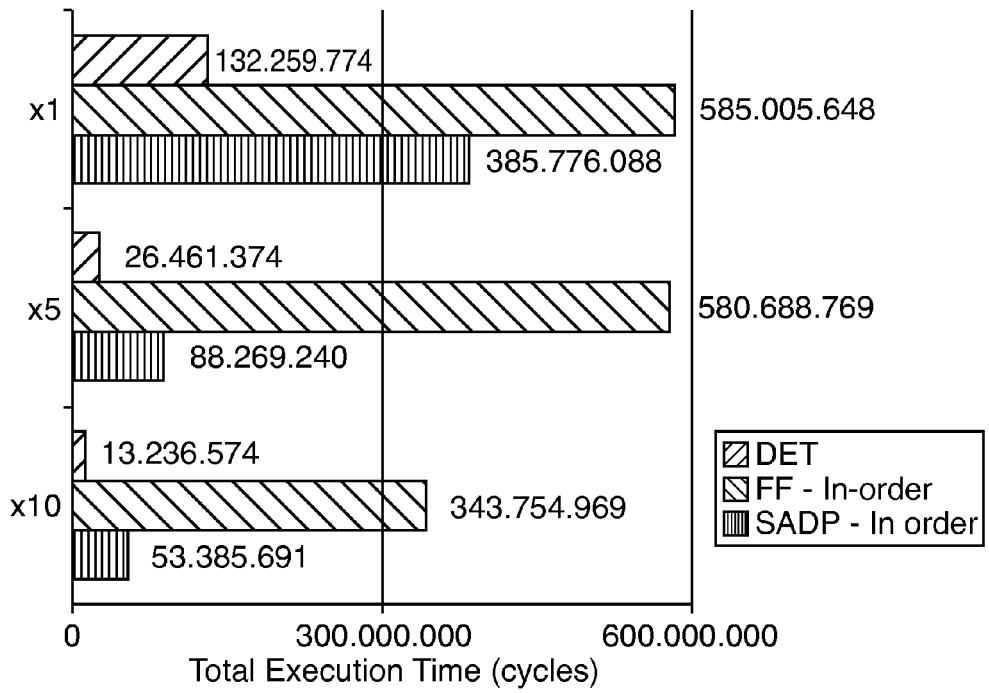
FIG. 12 shows for different selection functions and the deterministic routing a bar diagram of the total execution time for traces with different compression factors in a simulated 2-ary 7-tree with in-order delivery.

FIG. 12 shows the total execution time when in-order delivery is guaranteed using a reorder-buffer size of 8 MB. As it can be observed, the differences among the routing algorithms are considerable. When no compression factor is applied, the deterministic routing algorithm reduces execution time by 4.4 over the adaptive one using FF as selection function. If SADP selection function is used, execution time is reduced by a factor of 2.9. If the injection rate is increased by applying a compression factor of 10, the improvements obtained by the deterministic routing algorithm over the adaptive one are increased even more. Execution time is decreased by a factor of 30 over FF, and 4 over SADP. In this case, the overhead of in-order delivery does not compensate the flexibility of adaptive routing. In particular, the proposed deterministic routing algorithm improves the time to deliver all the messages of the I/O traces over the SADP adaptive proposal by a factor near 3 and does not need the re-order buffer and its associated hardware.

An easy implementation of the proposed deterministic routing strategy for fat-trees can use the FIR technique: Flexible Interval Routing. The adaptive routing implementation can also apply FIR, since the IR or Internal Routing usually applied to implement adaptive routing algorithms is a subset of FIR. FIR can implement the most commonly-used routing algorithms in meshes and tori. In FIR, as in IR, each output port has also an associated cyclic interval, which is implemented with a First Interval and Last Interval registers. In addition, in order to increase flexibility, each output port has a Mask Register that indicates which bits of the packet destination address are compared with the output port bounds provided by the First Interval and Last Interval registers. Moreover, in order to guarantee deadlock freedom, some routing restrictions must be usually applied, and in FIR are taken into account by means of a Routing Restrictions Register (RRR), represented at the top of FIG. 1. The RRR defines, for each output port, which other output ports of the switch should be selected prior to this one. This register has one bit per output port. For a given output port i, the j bit in the RRR indicates whether the output port j has more preference than output port i and sets bit to "1", otherwise the bit is set to "0". Thus, the final routing decision for an output port i is obtained not only by comparing the masked destination with the interval bounds, but also by checking the bits in its RRR.

Returning to FIG. 1, the FIR register configuration is shown for a 2-ary 3-tree, representing the First Interval (FI), Last Interval (LI) registers and Mask Register (MR) as a sequence of bits depicted on the ascending and descending links. In the first stage (stage 0), MR is set to 001, as only the least significant bit of the packet destination is selected and compared with FI and LI. Packets are forwarded through the ascending output port depending on the least significant component of its destination. At the next stage (stage 1), the next bit or component is considered, MR is set to 010, and so on. In k-ary n-trees with k>2 the components have more than one bit and, thus, in the MR more than one bit is set to "1" to select the component given by the switch stage. Descending links have the same values stored in FI and LI as the ones with adaptive routing, since the path reduction is only done in the upwards phase. As the MR is not used in the downwards phase, it is set to all 1s to select all the bits in the destination address. Notice that, the same downwards paths valid in the adaptive case are also valid in the deterministic case, but only one is actually used. As it can be seen in FIG. 1, the destinations reachable through the descending links of a switch, for instance, destinations 0 and 1 at switch 0, are also included in the ascending intervals, so packets destined to that nodes could be incorrectly forwarded through those upwards links. To avoid this problem, the RRR register is used to give preference to the descending links over the ascending ones and guarantee a minimal path. In the RRR, the half lowest significant bits correspond to the descending links and the half most significant to the ascending ones. Therefore, in the ascending links 2 and 3, the RRR stores 0011, to give preference to links 0 and 1. In this way, as an example, when routing a packet to destination 0 at switch 0, both output ports, 0 and 2, may be allowed, since this destination, after being masked, is included in the intervals associated to both output ports, but as output port 2 gives preference to output port 0, output port 2 is not finally returned.

In this text, the term "comprises" and its derivations (such as "comprising", etc.) should not be understood in an excluding sense, that is, these terms should not be interpreted as excluding the possibility that what is described and defined may include further elements, steps, etc.

In the context of the present invention, the term "approximately" should be understood as indicating values very near to those which accompany the aforementioned term and the same applies to the terms "about" and "around". That is to say, a deviation within reasonable limits from an exact value should be accepted, because a skilled person in the art will understand that such a deviation from the values indicated is inevitable due to measurement inaccuracies, etc.

Some preferred embodiments of the invention are described in the dependent claims which are included next.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for routing data packets in interconnection networks, wherein at least one switch is located at a stage (s) of a multistage interconnection network and configured to send, through an output port from a number (2k) of output ports forming an ordered list at the switch, at least a data packet containing a destination address identified by a n-tuple composed by a plurality (n) of components $(p_{n-1}, \ldots, p_1, p_0)$, being $0 \leq p_i < k$ for $i \in \{0 \ldots (n-1)\}$, $n \geq 2$, $k \geq 1$ and the stage (s) of the switch an integer $s \in \{0 \ldots (n-1)\}$, characterised this method by selecting a preferred output port in both ascending and descending phases from the number (2k) of output ports which corresponds to a position (i) in the ordered list of output ports given solely by the component $(p_s)$ of the destination address in turn corresponding to the position given by the stage (s) of the switch.

2. The method according to claim 1, further comprising sending the, at least one, data packet through the preferred output port.

3. The method according to claim 1, further comprising executing a linear rotative search in the ordered list of output ports starting at position (i+1) subsequent to the position (i) of the preferred output port until finding a free output port.

4. The method according to claim 3, further comprising sending the data packet through the found free output port.

5. A switch for routing data packets in interconnection networks, which comprises:
at least one input port to receive data packets including a destination address identified by a n-tuple composed by a plurality (n) of components $(p_{n-1}, \ldots, p_1, p_0)$, being $n \geq 2$;
at least one output port from a number (2k) of output ports forming an ordered list to send the received data packet, being $k \geq 1$;
wherein the switch is located at a stage (s) of a multistage interconnection network, being $s \in \{0 \ldots (n-1)\}$, and the switch further comprises selection means to selectively route the received data packet by selecting a preferred output port in both ascending and descending phases from the number (2k) of output ports which corresponds to a position (i) in the ordered list of output ports given solely by the component $(p_s)$ of the destination address in turn corresponding to the position given by the stage (s) of the switch.

6. The switch according to claim 5, wherein the selection means comprise a multiplexer to output the component $(p_s)$ of the destination address corresponding to the position given by the stage (s) of the switch.

7. The switch according to claim 6, wherein the selection means is further comprises a programmable priority encoder having an input connected to the output of the multiplexer and programmed to execute a linear rotative search in the ordered list of output ports starting at the position (i) corresponding to the preferred output port until finding a free output port.

8. A network of switches interconnected following a topology, comprising at least a switch according to claim 5.

9. The network of switches according to claim 5, further comprising at least a processing node connected to a switch located at the first stage of the topology, the processing node identified by an address consisting of a plurality (n) of components $(p_{n-1}, \ldots, p_1, p_0)$ forming a n-tuple and being $n \geq 2$.

10. The network of switches according to claim 9, wherein the switch and the processing node are interconnected in a topology of fat-tree.

* * * * *